April 10, 1928.
J. PATRICK
TEMPERATURE COMPENSATING SPRING
Filed Oct. 10, 1921
1,665,322
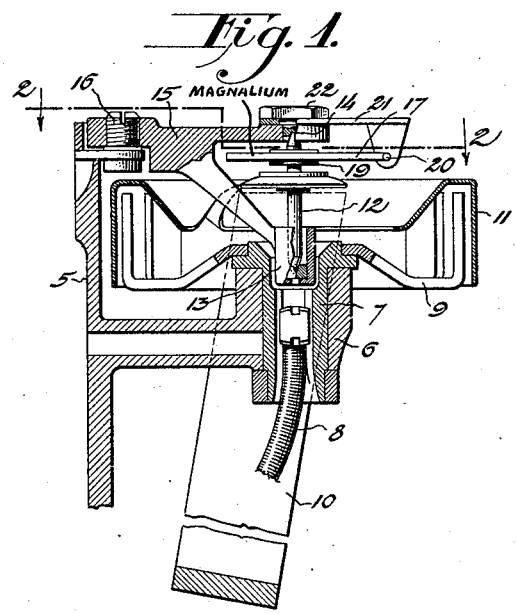
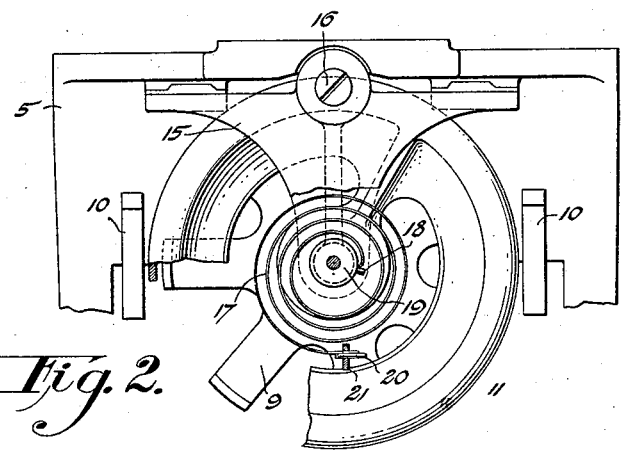
Inventor:
Joshua Patrick
By his Attorneys:

Patented Apr. 10, 1928.

1,665,322

UNITED STATES PATENT OFFICE.

JOSHUA PATRICK, OF DETROIT, MICHIGAN.

TEMPERATURE-COMPENSATING SPRING.

Application filed October 10, 1921. Serial No. 506,771.

In the construction of various types of indicating and measuring instruments in which an indicating element is moved in one direction by means responsive to variations in physical conditions, it is common practice to subject the moving parts to the action of spring means tending to move them in the opposite direction, in other words, to stress the indicating element toward the zero position by resilient means. Some instruments of this type are affected by variations in temperature of the environing medium which change the capability or sensitiveness of the physical condition responsive devices. Well-known examples of devices of this type are the speedometers, tachometers and the like which utilize the flux produced by relative rotation of a magnet and a magnetic mass to cause deflection of a non-magnetic element pivotally supported in the magnetic field. Since the conductivity of the drag element decreases with increase of temperature, the deflection corresponding to a given speed of relative rotation also decreases, and where instruments of this type are subjected to a considerable range of environing temperature, the error in indication becomes so great as to require compensation in some manner.

In accordance with the present invention, I propose to reduce the error due to temperature changes in connection with instruments liable to such error by selecting for the resilient means operating to stress or bias the moving element toward zero position, a substance capable of inherently compensating, to a considerable extent, for the temperature error. I have found, for example, that some alloys suffer a marked decrease in elasticity with increasing temperatures, a decrease which is sufficient to materially affect the resilience of a spring constructed from such alloys, even within moderate ranges of temperature, such, for example, as climatic variations. By utilizing for the biasing spring of the instrument an alloy of the character referred to, the accuracy of the instrument will be materially enhanced.

By way of illustration, I have shown in the accompanying drawings an instrument of the type ordinarily designated as "magnetic speedometers", of which—

Fig. 1 is a fragmentary sectional elevation, and

Fig. 2 is a plan view on line 2—2 of Fig. 1.

Referring to the drawings: 5 indicates the frame of a magnetic speedometer especially designed for motor vehicles, although it will be understood that the invention is in no way limited to use in instruments of this character. The frame includes a bearing 6 for a hollow shaft 7, driven by flexible shafting 8, and carrying at the upper end a magnetic mass 9 arranged to rotate within the field of a permanent magnet 10. A so-called "speed cup" 11, upon the periphery of which suitable indicating characters may be arranged, is interposed between the poles of the magnet and the rotor 9 in such relation as to be affected inductively when the mass is rotated. The cup is supported upon a spindle 12 supported in bearings 13, 14 mounted in a frame element 15 attached to the frame 5 as by screw 16. The material of the speed cup may be, and preferably is, of a special alloy such, for example, as magnalium, the use of which for this purpose is disclosed in my copending application Serial No. 502,524, filed September 22, 1921. The speed cup is stressed toward zero position, in opposition to the inductive drag due to the relative rotation between the magnet and rotor, by a spring 17 shown as of a flat spiral form. This biasing spring is attached at its inner and outer ends respectively to the spindle of the drag element or speed cup and to a fixed part of the frame. The means of attachment may of course be varied greatly, but as shown it comprises, for the inner end of the spiral, a pin 18 securing the spring to a disk 19 formed on the spindle 12, and, for the outer end, a pin or wedge 20 adapted to clamp the end of the spring in an aperture formed in bracket 21 suitably secured, as by screw 22, to the frame member 15. The spring 17 will be made, in accordance with my invention, of a material having, to a marked extent, the property of reduction of elasticity with increase in temperature. By utilizing for this purpose the alloys which I have found to possess the desired property, it is possible to reduce the limits of error in instruments of the class referred to considerably below those obtainable even with the speed cup alloy of my copending application. The accuracy of an instrument thus constructed is quite sufficient for practical purposes without the use of any accessory thermostatic or like compensating devices.

Among the alloys suitable for the purpose herein set forth, mention may be made particularly of brass and magnalium, the latter comprising, for this use, in the neighborhood of three per cent of magnesium and ninety-seven per cent of aluminum. Magnalium appears, from my experiments, to have a greater change in elasticity for the same range of temperature than any of the other substances tested. Where it is desired to solder the spring to the associated parts, however, a brass spring would be more suitable, since it is necessary to support the magnalium by clamps or the like.

In view of the general applicability of the invention, it will be understood that variations from the specific disclosure herein may be made without departing from the spirit of the invention or the scope of the appended claims.

I claim:

1. In an indicating instrument the indications of which are subject to error due to environing temperature, the readings being progressively lower as the temperature increases, a biasing spring the elasticity of which becomes less as temperature increases to such an extent as to afford compensation for the said error.

2. An indicating instrument comprising a magnet and a magnetic mass mounted for relative rotation, a body arranged to be deflected by the inductive effect of such rotation, and a spring operative upon said body, said spring of a material capable of affording compensation for error due to decrease in deflection of said body with increasing temperature.

3. Structure as in claim 2, the spring being of material the elasticity of which decreases materially with increasing temperature within climatic ranges.

4. Structure as in claim 2, the spring being of magnalium.

5. A speedometer comprising a magnet and a magnetic mass arranged for relative rotation, a speed cup having portions interposed between the magnet and mass and adapted to be deflected from a zero position upon the occurrence of relative rotation between said magnet and mass, and a spring arranged to stress said cup toward zero position, said spring being composed of magnalium.

In testimony whereof I affix my signature.

JOSHUA PATRICK.